UNITED STATES PATENT OFFICE.

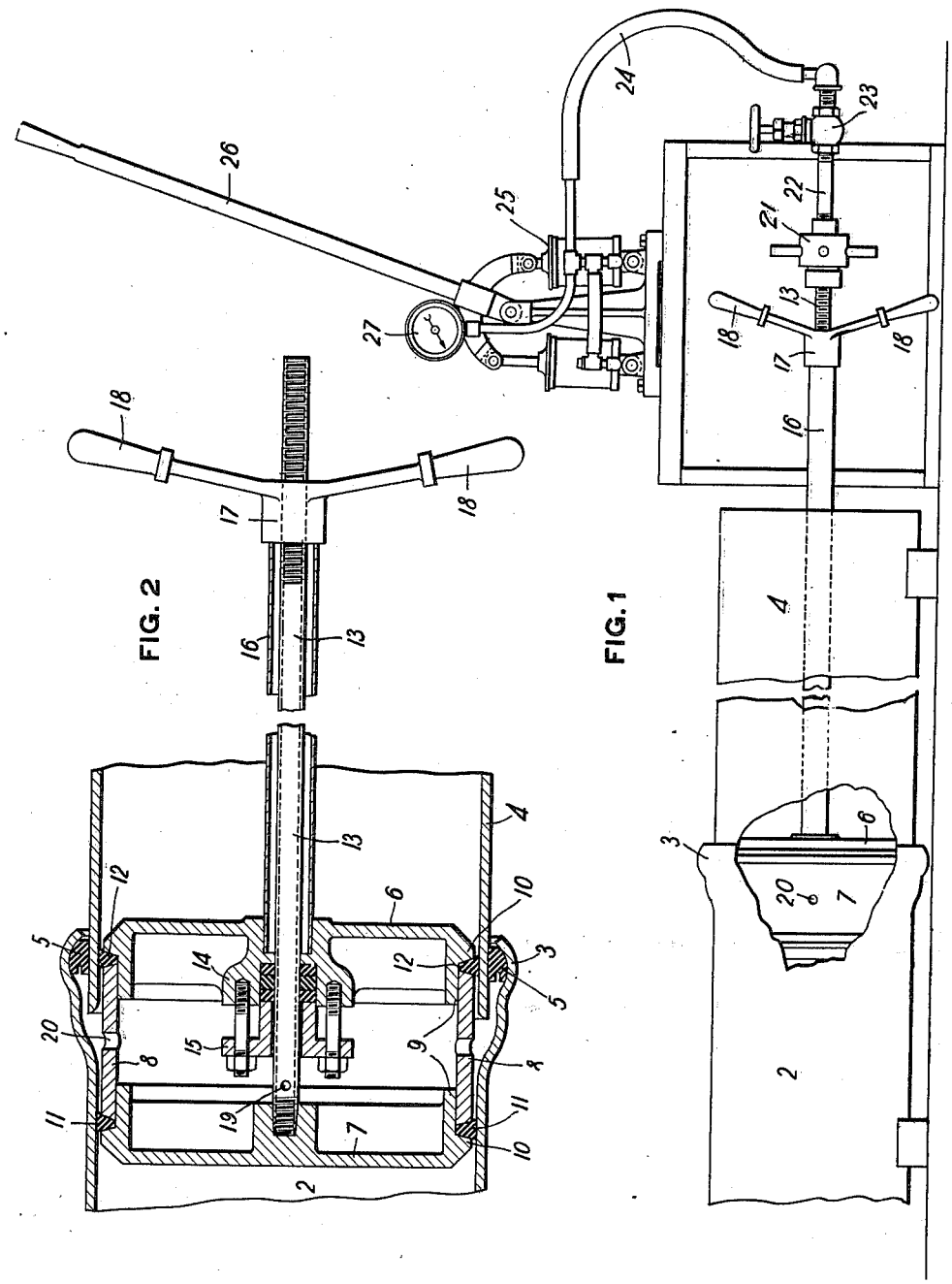

AUGUSTUS M. SAUNDERS, OF McKEESPORT, PENNSYLVANIA, ASSIGNOR TO NATIONAL TUBE COMPANY, OF PITTSBURGH, PENNSYLVANIA, A CORPORATION OF NEW JERSEY.

GASKET-SETTING MECHANISM.

1,036,913.

Specification of Letters Patent.

Patented Aug. 27, 1912.

Application filed April 24, 1912. Serial No. 692,934.

*To all whom it may concern:*

Be it known that I, AUGUSTUS M. SAUNDERS, a citizen of the United States, residing at McKeesport, in the county of Allegheny and State of Pennsylvania, have invented a new and useful Gasket-Setting Mechanism, of which the following is a specification.

My invention has relation to the class of pipe joints shown and covered in my Patent No. 853,900 for a pipe joint, granted May 14, 1907, and the invention is designed for use in positioning and setting the gaskets of such pipe joints in place in providing tight joints between the ends of the pipes or tubes.

One object of my invention is to provide a gasket setting mechanism of improved construction having novel means whereby the gaskets inserted between the telescoping ends of the pipes in forming tight joints are easily and quickly forced into position.

Another object of the invention is to provide a portable gasket setting mechanism adapted for use on pipes or tubes of widely varying lengths having improved means whereby the gasket setting mechanism is utilized to test the joints as made, to the end that leaks in the joints of the laid piping or joints after the completion of the pipe line is avoided and rendered unnecessary.

In the accompanying drawings illustrating my invention and forming part of this specification, Figure 1 is a side elevation partly in section showing the small end of a tube telescoped within the bell end of another tube with the gasket setting mechanism forming my invention in position to force the gasket into tight engagement with the opposing faces of the telescoped pipes. Fig. 2 is an enlarged longitudinal section showing my improved gasket setting mechanism as positioned in the tubes in the gasket setting operations.

In the accompanying drawings, 2 designates a pipe or tube having an enlarged or bell end 3 thereon, and 4 is the end of a tube as telescoped within the bell end 3 of the first pipe in forming a pipe line. A rubber gasket 5 of the construction described and claimed in my Patent No. 853,900 is shown in position within the bell end of the pipe 3 as it is located in forming a tight joint between the ends of the pipes 2 and 4.

Positioned within the pipes 2 and 4 is an expanding head formed of the relatively movable sections 6 and 7 and a tubular section 8 which surrounds the reduced portions 9 of the sections 6 and 7 and with the flanges 10 on the sections 6 and 7 forms annular grooves in which the rubber gaskets 11 and 12 are located.

The front section 7 of the head is connected to one end of a pipe 13, which extends through the stuffing box 14 and gland 15 in the rear section 6 thereof and the larger pipe 16 secured by one end in the section 6 of the head. The pipes 13 and 16 are made of a length greater than that of the longest pipe or tube 4 which will be used in forming a line of piping or tubing having joints constructed as shown in the drawing.

The rear end of the pipe 13 has screw threads extending for some distance inwardly, a straight thread being used, and on this screw threaded portion of the pipe 13 a handled nut 17 is mounted, the handles 18 projecting outwardly to provide a convenient means for turning the nut 17 on the pipe 13. The rear end of the pipe 16 through which the rear end of the pipe 13 projects engages with one face of the nut 17. The front end of the smaller pipe 13 adjacent to the front head 7 has a transverse opening 19 through its side walls by which the interior of the pipe 13 is connected with the space between the heads and the tubular section 8 of the head. Openings 20 in the section 8 afford communication between the interior of this space and the bell end of the pipes or tubes 2.

The rear end of the pipe 13 is connected by means of a quickly detachable pipe joint 21 with the pipe 22 which has a valve 23 thereon and which is connected by a flexible connection 24 with the double-acting hand force pump 25. The force pump is provided with an operating lever 26 and with a pressure gage 27, the pump being employed to supply the fluid pressure used in forcing the gaskets 5 into position with the bell ends 3 of the tubes or pipes 2.

In using my improved apparatus, a tube is placed in position with respect to the adjacent tube in a pipe line with the small end of one tube extending within the bell end 3 of the other tube, the gasket 5 being placed within the bell end 3 preparatory to inserting the telescoped end of the other pipe.

The head formed by the sections 6 and 7 and tubular section 8 is inserted within the last section 4 of the line of pipe being laid until it is in position with respect to the joint between the pipe sections shown in Figs. 1 and 2. The length of the last laid pipe being known and being marked upon the rear end of the pipe 16, by bringing such mark in line with the end of the pipe 4, the position of the head in the opposite end of the pipe or with respect to the joint in which the gasket is to be set will be known. The nut 17 is then screwed upon the pipe 13 by means of the handles 18 so as to move the sections 6 and 7 of the head toward each other. This movement of the head sections expands the gaskets 11, 12, so that the outer surfaces of these gaskets are forced tightly into engagement with the surrounding surfaces of the pipes 2 and 4. The hand pump 25 is then operated by means of the handle 26 to fill the space between the head sections 6 and 7 and the bell end of the pipe 2 with fluid pressure, the pressure gage 27 on the pump indicating when the desired pressure has been obtained. When the pressure begins to rise, the gasket 5 will be forced forwardly into tight engagement with the opposing faces of the telescoping pipe ends so as to form a tight joint therebetween. After the desired pressure has been obtained in forming the joint, by allowing the pressure to remain in the head of my improved apparatus for an interval of time, the absence of leakage will be indicated by a sustained pressure on the gage.

The stuffing box 14 and gland 15 in the section 6 of the head prevent leakage of fluid pressure through the openings in the head 6 for the pipe 13 and by adjusting the head sections 6 and 7 toward each other by means of the handled nut 17, the gaskets 11 are expanded to form a tight joint between the sections 6 and 7 of the head and the walls of the pipes in which the joint is being formed. After the gasket 5 has been forced into position the nut 17 is turned to back off the nut 17 on the pipe 13 so as to move the head sections away from each other and permit the expanded rubber gaskets 11 to contract. In this way the head is freed from the pipes or tubes 2 and 4, and the pipe 13 is then utilized as a handle to remove the head from the pipe 4. Another section of the line of piping or tubing being put into place, the head is inserted in such section until in the relative position between the last laid section and adjoining section of the pipe line shown in the drawings and the above described operations are then repeated. The operations as before described are then repeated with successive sections of pipe or tubes as laid.

The advantages of my invention will be apparent to those skilled in the art.

The apparatus is simple and is easily kept in repair.

By making the head of aluminum an apparatus is obtained which is light and easily handled in inserting and removing the head from the pipes.

By means of my improved apparatus the gaskets forming the joint between the sections of the pipe line are easily and quickly forced into place and the formation of tight joints is readily indicated by the pressure gage of the force pump so that liability of having leaky joints between sections of the pipe at a distance from the end of the laid pipe line is avoided and rendered unnecessary.

Modifications in the construction and arrangement of the parts may be made without departing from my invention as defined in the claims.

I claim:—

1. Gasket setting mechanism comprising a head adapted to be inserted within a pipe or tube, expanding rings on said head arranged to engage the walls of the telescoped ends of two pipes or tubes, means for expanding said rings into engagement with the walls of the telescoped pipes, and means for supplying fluid pressure to the head between the expanded rings thereon.

2. Gasket setting mechanism comprising a head adapted to be inserted within a pipe or tube, expanding rings on said head arranged to engage the walls of the telescoped ends of two pipes or tubes, means for expanding said rings into engagement with the walls of the telescoped pipes, and a hand pump connected to said head whereby fluid pressure is supplied to the head between the expanded rings thereon.

3. Gasket setting mechanism comprising a head made in sections and having expansible rings on the ends of said sections, said head being adapted to be inserted within a pipe or tube, means for adjusting the head sections to expand the rings within the pipes or tubes and means for supplying fluid pressure to the head between the expanded rings.

4. Gasket setting mechanism comprising a head having shouldered sections, an annular ring on the head sections between said shoulders, flexible rings between the shoulders and the ends of said annular ring, means for relatively moving said sections to expand the flexible rings within a pipe or tube and means for supplying fluid pressure to the head between said expansible rings.

5. Gasket setting mechanism comprising shouldered head sections, an annular ring between the shoulders on said sections, expansible rings between the annular ring and the shoulders on said head sections, a pipe connected to one head section and forming means for supplying fluid pressure to said head between the expansible rings, a second pipe connected to the other head section, and means engaging with the ends of said pipes whereby the head sections are moved to expand and retract said expansible rings.

6. Gasket setting mechanism comprising in combination a head having double walls, said head being arranged to be positioned within a line of pipe with one wall of the head on each side of a joint in said pipe line, fluid connections to the space between said walls, and means for sealing the joints between said walls and the inner walls of the pipe line, within which the head is seated.

In testimony whereof, I have hereunto set my hand.

AUGUSTUS M. SAUNDERS.

Witnesses:
    JAS. P. DAVIS,
    CHARLES H. STARR.